(12) United States Patent
Gaffney

(10) Patent No.: US 10,239,049 B2
(45) Date of Patent: Mar. 26, 2019

(54) ALLOYED ZEOLITE CATALYST COMPONENT, METHOD FOR MAKING AND CATALYTIC APPLICATION THEREOF

(71) Applicant: AMG CHEMISTRY AND CATALYSIS CONSULTING, LLC, Idaho Falls, ID (US)

(72) Inventor: Anne Mae Gaffney, Idaho Falls, ID (US)

(73) Assignee: AMG Chemistry and Catalysis Consulting, LLC, Idaho Falls, ID (US)

( * ) Notice: Subject to any disclaimer, the term of this patent is extended or adjusted under 35 U.S.C. 154(b) by 226 days.

(21) Appl. No.: 15/194,857

(22) Filed: Jun. 28, 2016

(65) Prior Publication Data

US 2016/0303548 A1 Oct. 20, 2016

Related U.S. Application Data

(63) Continuation of application No. 13/396,160, filed on Feb. 14, 2012, now Pat. No. 9,404,045.

(Continued)

(51) Int. Cl.

| | |
|---|---|
| *B01J 29/06* | (2006.01) |
| *B01J 29/068* | (2006.01) |
| *B01J 29/44* | (2006.01) |
| *B01J 37/02* | (2006.01) |
| *B01J 37/08* | (2006.01) |
| *B01J 37/28* | (2006.01) |
| *B01J 29/064* | (2006.01) |
| *B01J 29/076* | (2006.01) |
| *B01J 29/42* | (2006.01) |
| *B01J 29/90* | (2006.01) |
| *B01J 37/03* | (2006.01) |
| *B01J 37/16* | (2006.01) |
| *B01J 38/12* | (2006.01) |
| *C10B 49/22* | (2006.01) |
| *C10B 53/07* | (2006.01) |
| *C10B 57/06* | (2006.01) |
| *C10G 1/10* | (2006.01) |
| *C10G 45/70* | (2006.01) |
| *B01J 29/072* | (2006.01) |
| *B01J 37/04* | (2006.01) |
| *B01J 37/06* | (2006.01) |
| *B01J 23/40* | (2006.01) |
| *B01J 23/70* | (2006.01) |

(Continued)

(52) U.S. Cl.
CPC ............ *B01J 29/068* (2013.01); *B01J 23/40* (2013.01); *B01J 23/70* (2013.01); *B01J 23/89* (2013.01); *B01J 29/064* (2013.01); *B01J 29/072* (2013.01); *B01J 29/076* (2013.01); *B01J 29/42* (2013.01); *B01J 29/44* (2013.01); *B01J 29/90* (2013.01); *B01J 37/0201* (2013.01); *B01J 37/0215* (2013.01); *B01J 37/035* (2013.01); *B01J 37/04* (2013.01); *B01J 37/06* (2013.01); *B01J 37/08* (2013.01); *B01J 37/16* (2013.01); *B01J 37/28* (2013.01); *B01J 38/12* (2013.01); *C10B 49/22* (2013.01); *C10B 53/07* (2013.01); *C10B 57/06* (2013.01); *C10G 1/10* (2013.01); *C10G 45/70* (2013.01); *B01J 35/109* (2013.01); *B01J 37/088* (2013.01); *B01J 37/10* (2013.01); *B01J 2229/18* (2013.01); *B01J 2229/183* (2013.01); *B01J 2229/186* (2013.01); *B01J 2229/40* (2013.01); *B01J 2229/42* (2013.01); *C10G 2300/1003* (2013.01); *C10G 2300/4081* (2013.01); *C10G 2400/20* (2013.01); *C10G 2400/22* (2013.01); *C10G 2400/30* (2013.01); *Y02P 20/143* (2015.11)

(58) Field of Classification Search
CPC ...... B01J 29/064; B01J 29/068; B01J 29/076; B01J 29/42; B01J 29/44; B01J 2229/18; B01J 2229/183; B01J 2229/2229; B01J 2229/186; B01J 2229/40; B01J 2229/42; B01J 35/109; B01J 37/035; B01J 37/16; B01J 37/0201; B01J 37/081; B01J 37/10; B01J 37/088; B01J 37/28; B01J 37/08; C10G 2300/1003
USPC ... 502/60, 61, 63, 64, 66, 67, 71, 73, 74, 77
See application file for complete search history.

(56) References Cited

U.S. PATENT DOCUMENTS

| | | | |
|---|---|---|---|
| 4,036,741 | A | 7/1977 | Pollitzer et al. |
| 4,851,601 | A | 7/1989 | Fukuda et al. |

(Continued)

FOREIGN PATENT DOCUMENTS

| | | |
|---|---|---|
| EP | 276081 | 7/1988 |
| EP | 321807 | 6/1989 |

(Continued)

OTHER PUBLICATIONS

Bhaskar, Thallada et al., "Prevention of Chlorinated Hydrocarbons Formation during Pyrolysis of PVC or PVDC Mixed Plastics," Green Chemistry, vol. 8, pp. 697-700, 2006.

(Continued)

*Primary Examiner* — Elizabeth D Wood
(74) *Attorney, Agent, or Firm* — Dunlap Codding, P.C.

(57) ABSTRACT

The presently disclosed and claimed inventive concept(s) generally relates to a solid catalyst component comprising a zeolite with a modifier and at least one Group VIII meal alloyed with at least one transition metal. The presently disclosed and claimed inventive concept(s) further relates to a method of making the solid catalyst component and a process of converting mixed waste plastics into low molecular weight organic compounds using the solid catalyst component.

15 Claims, 1 Drawing Sheet

Related U.S. Application Data

(60) Provisional application No. 61/443,850, filed on Feb. 17, 2011.

(51) Int. Cl.
*B01J 23/89* (2006.01)
*B01J 35/10* (2006.01)
*B01J 37/10* (2006.01)

(56) References Cited

U.S. PATENT DOCUMENTS

| | | | |
|---|---|---|---|
| 4,871,426 A | 10/1989 | Lechert et al. | |
| 5,079,385 A | 1/1992 | Wu | |
| 5,149,680 A | 9/1992 | Kitson et al. | |
| 5,192,809 A | 9/1993 | Jones et al. | |
| 5,439,859 A | 8/1995 | Durante et al. | |
| 5,462,971 A | 10/1995 | Gaffney et al. | |
| 6,784,333 B2 | 8/2004 | Juttu et al. | |
| 7,563,345 B2 | 7/2009 | Tokarz | |
| 7,605,108 B2 * | 10/2009 | Wakamatsu | B01J 37/16 502/302 |
| 7,879,749 B2 | 2/2011 | Rollins et al. | |
| 2006/0102521 A1 * | 5/2006 | Zhou | B01J 23/42 208/138 |
| 2006/0205587 A1 * | 9/2006 | Chang | B01J 29/06 502/64 |
| 2007/0060470 A1 | 3/2007 | Bogdan et al. | |
| 2007/0076233 A1 * | 4/2007 | Lee | C09D 11/037 358/1.9 |
| 2007/0203385 A1 * | 8/2007 | Chang | B01J 29/83 585/639 |
| 2008/0072705 A1 * | 3/2008 | Chaumonnot | B01J 23/002 75/338 |
| 2008/0307697 A1 | 12/2008 | Fieni et al. | |
| 2009/0227823 A1 | 9/2009 | Huber et al. | |
| 2010/0076233 A1 | 3/2010 | Cortright et al. | |
| 2010/0168467 A1 | 7/2010 | Johnston et al. | |
| 2010/0217057 A1 | 8/2010 | Domokos et al. | |
| 2011/0079540 A1 | 4/2011 | Krishna et al. | |

FOREIGN PATENT DOCUMENTS

| | | |
|---|---|---|
| EP | 414439 | 2/1991 |
| WO | 2008126040 | 10/2008 |
| WO | 2010/030369 | 3/2010 |
| WO | 2010/045928 | 4/2010 |

OTHER PUBLICATIONS

Chen, J.G. et al., "Monolayer Bimetallic Surfaces: Experimental and Theoretical Studies Trends in Electronic and Chemical Properties," Surface Science Reports, vol. 63, No. 5, pp. 202-246, May 2008.

* cited by examiner

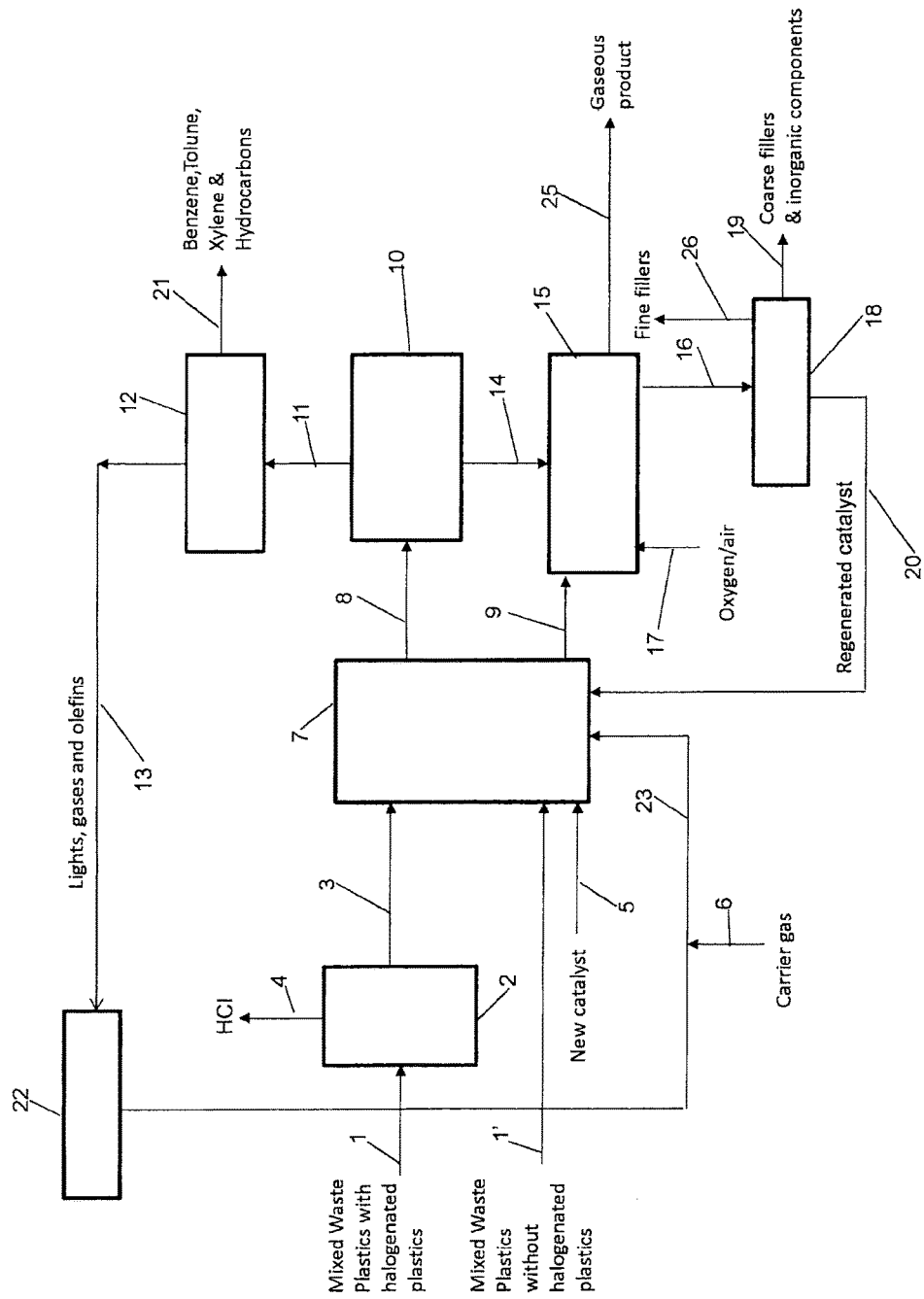

ALLOYED ZEOLITE CATALYST COMPONENT, METHOD FOR MAKING AND CATALYTIC APPLICATION THEREOF

CROSS REFERENCE TO RELATED APPLICATIONS

The present application is a continuation of U.S. Ser. No. 13/396,160, filed Feb. 14, 2012; which claims the benefit under 35 U.S.C. 119(e) of U.S. Provisional Application Ser. No. 61/443,850, filed Feb. 17, 2011, the entirety of which is hereby expressly incorporated herein by reference.

TECHNICAL FIELD

The presently disclosed and claimed inventive concept(s) generally relates to a solid catalyst component comprising a zeolite with a modifier and at least one Group VIII metal alloyed with at least one transition metal. The presently disclosed and claimed inventive concept(s) further relates to a method of making the solid catalyst component and a process of converting mixed waste plastics into low molecular weight organic compounds using the solid catalyst component.

BACKGROUND OF THE INVENTION

In view of the increasing importance of polymers as substitutes for conventional materials of construction such as glass, metal, paper, and wood, the perceived need to convert non-renewable resources such as petroleum and dwindling amount of landfill capacity available for the disposal of waste products, considerable attention has been devoted in recent years to the problem of recovering, reclaiming, recycling or in some way reusing mixed waste plastics.

It has been proposed to pyrolyze or catalytically crack the mixed waste plastics so as to convert high molecular weight polymers into volatile compounds having much lower molecular weight. The volatile compounds, depending on the process employed, can be either relatively high boiling liquid hydrocarbons useful as fuel oils or fuel oil supplements or light to medium boiling hydrocarbons useful as gasoline-type fuels or as chemical "building blocks".

U.S. Pat. No. 5,462,971 teaches a process for reclaiming a polyether polyol, comprising the steps of: (a) heating the polyether polyol and a zeolite-containing particulate catalyst in a fluidized bed reaction zone at a temperature effective to produce a volatile organic component and a spent catalyst component having carbon deposited thereon; (b) withdrawing a first stream comprising the volatile organic component from the reaction zone; (c) withdrawing a second stream comprising the spent catalyst component; and (d) heating the second stream in a regeneration zone in the presence of oxygen at a temperature effective to convert the carbon to carbon dioxide and water and to regenerate the catalyst.

It has also been proposed to pyrolyze or catalytically crack thermoset polymers so as to convert the high molecular weight polymers into volatile compounds having much lower molecular weight. U.S. Pat. No. 5,192,809 teaches a process for reclaiming a filled thermoset polymer, comprising the steps of: (a) heating particles of the polymer and a zeolite-containing particulate catalyst in a fluidized bed reaction zone at a temperature effective to produce a coarse filler component, coke, a volatile organic component, and a spent catalyst component; (b) withdrawing a first stream comprising the volatile organic component from the reaction zone; (c) withdrawing a second stream comprising the spent catalyst, the coke, and the coarse filler component from the reaction zone; (d) heating the second stream in a regeneration zone in the presence of oxygen at a temperature effective to convert the coke to carbon dioxide and water and to regenerate the catalyst; and (e) separating the regenerated catalyst and the coarse filler component.

It has been demonstrated that the pyrolysis of polyvinyl chloride (PVC) and polyvinylidene chloride (PVDC) can be performed in a two-step temperature program to minimize the formation of chlorinated hydrocarbons. The two-step temperature program eliminated the hydrogen chloride form the reactor and avoided the formation of chlorinated hydrocarbons in the liquid products. The two-step pyrolysis produced the plastic derived oils without halogenated hydrocarbons (less than 15 ppm). This work was published by Bhaskar, el al., in Green Chem., 2006, 8, 697-700.

U.S. Pat. No. 5,079,385 teaches a process for converting solid plastic materials into usable lower molecular weight hydrocarbonaceous materials by heating such plastic materials at elevated temperatures in effective contact with an acidic catalyst comprising at least one zeolite having acid activity. The catalyst may be comprised of ZSM-5 and at least one catalytic metal. The metal may be at least one of platinum, palladium, nickel, cobalt, iron, zinc, magnesium, molybdenum, tungsten, titanium, gallium, tantalum and chromium. The process claims co-feeding of hydrogen or a source of hydrogen to the reaction zone.

SUMMARY OF THE INVENTION

The following presents a simplified summary of the presently disclosed and claimed inventive concept(s) in order to provide a basic understanding of some aspects of the presently disclosed and claimed inventive concept(s). This summary is not an extensive overview of the presently disclosed and claimed inventive concept(s). It is intended to neither identify key or critical elements of the presently disclosed and claimed inventive concept(s) nor delineate the scope of the presently disclosed and claimed inventive concept(s). Rather, the sole purpose of this summary is to present some concepts of the presently disclosed and claimed invention in a simplified form as a prelude to the more detailed description that is presented hereafter.

The presently disclosed and claimed inventive concept(s) provides a solid catalyst component, a method of making the solid catalyst component and a process of converting mixed waste plastics into low molecular weight organic compounds using the solid catalyst component. The solid catalyst component comprises a zeolite with a modifier and at least one Group VIII metal alloyed with at least one transition metal. The modifier can be phosphorus, boron, an additive, or combinations thereof. The additive can be gallium, zinc, zirconium, niobium, tantalum, or combinations thereof. The Group VIII metals can be platinum, palladium, silver, gold, rhodium, ruthenium, iridium or combinations thereof. The transition metals can be titanium, vanadium, chromium, manganese, iron, cobalt, nickel, copper, zinc, molybdenum, tungsten or combinations thereof.

The mixed waste plastics can be converted into lower molecular weight organic compounds used as chemical intermediates, solvents, or fuels. The fillers such as glass fibers or inorganic powders can be recovered in re-useable form from the mixed waste plastics. PVC, PVDC and other halogenated plastics can be decomposed in a pre-pyrolysis step. The presently disclosed and claimed inventive concept(s) pertains to the use of a fluid-bed reactor and an integratedcatalyst regenerator for continuous catalyst recycling operation. Hydrogen and/or a hydrogen source such as methanol can be added to the mixed waste plastic feed. In addition, lights, gases and olefins generated can be recycled back to the fluidized bed reactor.

To the accomplishment of the foregoing and related ends, the presently disclosed and claimed inventive concept(s) involves the features hereinafter fully described and particularly pointed out in the claims. The following description and the annexed drawing set forth in detail certain illustrative aspects and implementations of presently disclosed and claimed inventive concept(s). These are indicative, however, of but a few of the various ways in which the principles of the presently disclosed and claimed inventive concept(s) may be employed. Other objects, advantages and novel features of the presently disclosed and claimed inventive concept(s) will become apparent from the following detailed description of the presently disclosed and claimed inventive concept(s) when considered in conjunction with the drawing.

BRIEF SUMMARY OF THE DRAWING

FIG. 1 is a high level schematic diagram of a process for converting mixed waste plastics into low molecular weight organic compounds.

DETAILED DESCRIPTION

The presently disclosed and claimed inventive concept(s) generally relates to a solid catalyst component comprising a zeolite with a modifier and at least one Group VIII metal alloyed with at least one transition metal, a method of making the solid catalyst component, and a process of converting mixed waste plastics into low molecular weight organic compounds using the solid catalyst component.

In this context, the term "zeolite" encompasses not only the true zeolites, which are characterized by having crystalline aluminosilicate three-dimensional structures arising from a framework of $[SiO_4]^{4-}$ and $[AlO_4]^{5-}$ coordination polyhedra linked through their corners, but also the "zeotypes", which are crystalline silicates that resemble true zeolites in structure and properties but are essentially alumina-free.

Zeotypes are exemplified by crystalline silica polymorphs (e.g., silicates, disclosed in U.S. Pat. No. 4,061,724 and organosilicates, disclosed in U.S. Pat. No. Re. 29,948), chromia silicates (e.g., CZM), ferrosilicates and galliosilicates (disclosed in U.S. Pat. No. 4,238,318), and borosilicates (disclosed U.S. Pat. Nos. 4,226,420, 4,269,813, and 4,327,236).

The use of crystalline aluminosilicate zeolite is preferred, however, such zeolites are well known and are described in Szostak, Molecular Sieves: Principles of Synthesis and Identification, Van Nostrand Reinhold (1989); Dyer, An Introduction to Zeolite Molecular, Sieves Wiley (1988); Jacobs, Carboniogenic Activity of Zeolite, Elseviar (1977); Breck, Zeolite Molecular Sieves: Structure, Chemistry, and Use, Wiley (1974); and Breck et al. "Molecular Sieves", in Kirk-Othmer Encyclopedia of Chemical Technology Vol. 15, p. 638.

Without limitation, zeolites can be selected from naturally-occurring zeolites, synthetic zeolites and combinations thereof. In certain embodiments, the zeolite can be a Mordenite Framework Inverted (MFI) type zeolite, such as a ZSM-5. Optionally, such a zeolite can comprise acidic sites.

In general, the ZSM-5 is ordinarily ion exchanged with a desired cation to replace alkali metal present in the zeolite as prepared. The exchange treatment is such as to reduce the alkali metal content of the final catalyst to less than about 0.5 weight percent, and preferably less than about 0.1 weight percent. The preferred proton source is ammonium chloride as opposed to hydrochloric acid, sulfuric acid and nitric acid. Ion exchange is suitably accomplished by conventional contact of the zeolite with an aqueous solution of the proton source.

Other types of zeolites include, but are not limited to, ferrierite, zeolite L, zeolite boron beta, TEA-modernite, ITQ-1, ITQ-21, MCM-22, MCM-36, MCM-39, MCM-41, MCM-48, PSH-3, Breck-6, ZSM-4, ZSM-8, ZSM-11, ZSM-12, ZSM-20, ZSM-21, ZSM-22, ZSM-23, ZSM-34, ZSM-35, ZSM-38, ZSM-48, ZSM-50, ZSM-57, SUZ-4, EU-1, SAPO-5, SAPO-11, SAPO-34, (S)AlPO-31, SSZ-23, TUD-1, VPI-5, and the like.

It will also be desirable to utilize the acidic forms of zeolites such as the ZSM types and borosilicates. HZSM-5 is particularly useful.

Other representative zeolites suitable for use include, but are not limited to, zeolite A (U.S. Pat. No. 2,882,243), zeolite X (U.S. Pat. No. 2,882,244), zeolite Y (U.S. Pat. No. 3,130,007), zeolite ZK-5 (U.S. Pat. No. 3,314,752), mordenite, chabazite, faujasite, erionite, offretite, and zeolite beta. Mixtures of zeolites may also be employed.

Also suitable for use will be zeolites loaded or doped with Group VIII metals such as platinum and palladium to facilitate secondary functions such as hydrogenation or hydrogenolysis in addition to the basic cracking reaction. Such bifunctional zeolites are well known and are described, for example, in Chapter V of Jacobs, Carboniogenic Activity of Zeolites, Elsever (1977).

The pore size of the zeolite can be varied to control the composition of the volatile organic component produced by reacting with mixed waste plastics. Thus, the pore size may be small (a pore/channel diameter <5 angstroms; generally, those zeolites having 8 tetrahedra constituting their pore defining ring), intermediate (a pore/channel diameter between 5-7 angstroms; generally, those zeolites having 10 tetrahedra or 12 puckered tetrahedra constituting their pore defining ring), or large (a pore/channel diameter >7 angstroms; generally, those zeolites having more than 12 tetrahedra in their pore defining ring). In general, the use of large pore size zeolite favors the production of higher molecular weight and higher boiling volatile organic compounds from the mixed waste plastics.

It may be desirable, in some embodiments, to employ one or more zeolites to establish a bimodal distribution of pore sizes. In some cases, a single zeolite with a bimodal distribution of pore sizes may be used (e.g., a single zeolite that contains predominantly 5.9-6.3 Å pores and 7-8 Å pores). In other cases, a mixture of two or more zeolites can be employed to establish the bimodal distribution (e.g., a mixture of two zeolites, each zeolite including a distinct range of average pore sizes).

For example, in some embodiments at least about 70%, at least about 80%, at least about 90%, at least about 95%, at least about 98%, or at least about 99% of the pores of the one or more zeolites have smallest cross-sectional diameters that lie within a first size distribution or a second size distribution. In some cases, at least about 2%, at least about 5%, or at least about 10% of the pores of the one or more zeolites have smallest cross-sectional diameters that lie within the first size distribution; and at least about 2%, at least about 5%, or at least about 10% of the pores of the one or more catalysts have smallest cross-sectional diameters that lie within the second size distribution. In some cases, the first and second size distributions are selected from the ranges provided above. In certain embodiments, the first and second size distributions are different from each other and do not overlap. An example of a non-overlapping range is 5.9-6.3 Angstroms and 6.9-8.0 Angstroms, and an example of an overlapping range is 5.9-6.3 Angstroms and 6.1-6.5 Angstroms. The first and second size distributions may be selected such that the ranges are not immediately adjacent one another, an example being pore sizes of 5.9-6.3 Angstroms and 6.9-8.0 Angstroms. An example of a range that is immediately adjacent one another is pore sizes of 5.9-6.3 Angstroms and 6.3-6.7 Angstroms.

As a specific example, in some embodiments one or more zeolites are used to provide a bimodal pore size distribution for the simultaneous production of aromatic and olefin compounds. One pore size distribution may advantageously produce a relatively high amount of aromatic compounds, and the other pore size distribution may advantageously produce a relatively high amount of olefin compounds. In some embodiments, at least about 70%, at least about 80%, at least about 90%, at least about 95%, at least about 98%, or at least about 99% of the pores of the one or more zeolites have smallest cross-sectional diameters between about 5.9 Angstroms and about 6.3 Angstroms or between about 7 Angstroms and about 8 Angstroms. In addition, at least about 2%, at least about 5%, or at least about 10% of the pores of the one or more catalysts have smallest cross-sectional diameters between about 5.9 Angstroms and about 6.3 Angstroms; and at least about 2%, at least about 5%, or at least about 10% of the pores of the one or more catalysts have smallest cross-sectional diameters between about 7 Angstroms and about 8 Angstroms.

In some embodiments, at least about 70%, at least about 80%, at least about 90%, at least about 95%, at least about 98%, or at least about 99% of the pores of the one or more zeolites have smallest cross-sectional diameters between about 5.9 Angstroms and about 6.3 Angstroms or between about 7 Angstroms and about 200 Angstroms. In addition, at least about 2%, at least about 5%, or at least about 10% of the pores of the one or more zeolites have smallest cross-sectional diameters between about 5.9 Angstroms and about 6.3 Angstroms; and at least about 2%, at least about 5%, or at least about 10% of the pores of the one or more zeolites have smallest cross-sectional diameters between about 7 Angstroms and about 200 Angstroms.

In some embodiments, at least about 70%, at least about 80%, at least about 90%, at least about 95%, at least about 98%, or at least about 99% of the pores of the one or more zeolites have smallest cross-sectional diameters that lie within a first distribution and a second distribution, wherein the first distribution is between about 5.9 Angstroms and about 6.3 Angstroms and the second distribution is different from and does not overlap with the first distribution. In some embodiments, the second pore size distribution may be between about 7 Angstroms and about 200 Angstroms, between about 7 Angstroms and about 100 Angstroms, between about 7 Angstroms and about 50 Angstroms, or between about 100 Angstroms and about 200 Angstroms. In some embodiments, the second zeolite may be mesoporous (e.g., having a pore size distribution of between about 2 nm and about 50 nm).

The solid catalyst component of this presently disclosed and claimed inventive concept(s) comprises either an unbound (unsupported) zeolite, or a zeolite combined with a binder (co-gel) or a support. Such zeolite binders or supports are well known in the art, as are methods of preparing bound or supported zeolites. Specific examples of the binders include, but are not limited to, silica, alumina, silica-alumina, silica-titania, silica-thoria, silica-magnesia, silica-zirconia, silica-beryllia, and ternary compositions of silica with other refractory oxides. Other useful binders or supports are clays such as montmorillonites, kaolins, bentonites, halloysites, dickites, nacrites and anaxites.

If a binder is used, it can be combined with a zeolite before or after the process by which metals are incorporated into the zeolite. The binder can comprise between about 2% and about 98% by weight of the combined weight of the binder and the zeolite. The quantity of the binder in the solid catalyst component is selected to achieve desired crush strength while maintaining sufficient catalyst activity in view of the dilution of the zeolite by the binder. In one embodiment, the binder comprises between about 5% by weight and about 70% by weight of the combined weight of the binder and the zeolite. In another embodiment, the binder comprises between about 10% by weight and about 50% by weight of the combined weight of the binder and the zeolite. In yet another embodiment, the binder comprises between about 15% by weight and about 30% by weight of the combined weight of the binder and the zeolite.

In the presently disclosed and claimed inventive concept (s), the zeolite can be modified by phosphorus, boron, and/or an additive. Zeolites containing group VA elements, especially phosphorus-containing zeolites, are particularly preferred for use since it has been unexpectedly found that this class of zeolites is very tolerant of steam and tends to retain an unusually high degree of activity and selectivity in the presence of steam. Zeolites containing Group VA elements are described in U.S. Pat. Nos. 3,977,832, 3,925,208, and 4,379,761, for example and in Vedrine, J. Catal. 73, 147 (1982).

Boron-containing zeolites or borosilicates (as described in U.S. Pat. Nos. 3,328,119, 4,029,716, 4,078,009, 4,269,813 and 4,656,016; and European Pat Pub. Nos. 77,946 and 73,482) are also especially preferred for use in view of the finding that such zeolites similarly show extremely good steam tolerance.

In general, the zeolite containing phosphorus, boron, or phosphorus and boron has a surface Si/Al ratio in the range from about 20 to about 60. Phosphorus, boron, or phosphorus and boron can be added to a zeolite by impregnating the zeolite with phosphorus, boron, or phosphorus and boron compound(s) in accordance with the procedures described, for example, in U.S. Pat. No. 3,972,832. In anther embodiment, the phosphorus, boron, or phosphorus and boron compound(s) can be added to multicomponent mixtures from which the solid catalyst component is formed. The phosphorus, boron, or phosphorus and boron compound(s) is added in amounts sufficient to provide a final zeolite composition having about 0.1 to about 10 wt. % phosphorus, boron, or phosphorus and boron. In one embodiment, the zeolite contains about 1 to about 3 wt. % of phosphorus, boron, or phosphorus and boron.

In an additional embodiment, the zeolite is activated with steam after incorporation of phosphorus, boron, or phosphorus and boron therein. The steam treatment may be in a preferred embodiment carried out as a discrete step prior to use of the catalyst. In one embodiment, the zeolite is heated at a temperature from about 500° C. to about 700° C. under about 1 to about 5 atmospheres steam for about 1 to about 48 hours. In another embodiment, the zeolite is heated at a temperature from about 550° C. to about 600° C. under about 1.5 to about 3 atmospheres steam for about 15 to about 30 hours.

An alternative method is to add about 1 to about 50 mol. % steam based on the total moles of the mixed waste plastic feed during the conversion process. In one embodiment about 2 to about 20 mol. % steam based on the total moles of the mixed waste plastic feed can be used to obtain further improvements in activity.

The additive may comprise a metal and/or a metal oxide. Specific examples of metals and/or oxides include, but are not limited to, gallium, zinc, zirconium, niobium, tantalum, and any of their oxides. The additives may be in the form of readily available compounds such as the metal salts with counter-anions such as nitrates, acetates, halides, oxy-halides, sulfates and the like.

In one embodiment, the metal and/or metal oxide can be impregnated into the zeolite (e.g., in the interstices of the lattice structure of the zeolite). In another embodiment, the metal and/or metal oxide can be incorporated into the lattice structure of the zeolite. For example, the metal and/or metal oxide might be included during the preparation of the zeolite, and the metal and/or metal oxide can occupy a lattice site of the resulting zeolite. The metal and/or metal oxide can react or otherwise interact with a zeolite such that the metal and/or metal oxide displaces an atom within the lattice structure of the zeolite. In yet another embodiment, metal and/or metal oxide can partially be incorporated into the lattice structure of the zeolite during the preparation of the zeolite and partially be impregnated into the zeolite.

In certain embodiments, a Mordenite Framework Inverted (MFI) zeolite comprising gallium, such as a galloaluminosilicate MFI (GaAlMFI) zeolite, can be used. GaAlMFI zeolite can be formed by replacing some of the Al atoms of aluminosilicate MFI zeolite with Ga atoms. In some instances, the zeolite can be in the hydrogen form (e.g., H-GaAlMFI). The galloaluminosilicate MFI zeolite can be a ZSM-5 in which some of the aluminum atoms have been replaced with gallium atoms.

In one embodiment, the ratio of moles of Si in the galloaluminosilicate zeolite to the sum of the moles of Ga and Al (i.e., the molar ratio expressed as Si:(Ga+Al)) in the galloaluminosilicate zeolite can be at least about 15:1, at least about 20:1, at least about 25:1, at least about 35:1, at least about 50:1, at least about 75:1, or higher. In another embodiment, it is advantageous to employ a zeolite with a ratio of moles of Si to the sum of the moles of Ga and Al of from about 15:1 to about 100:1, from about 15:1 to about 75:1, from about 25:1 to about 80:1, or from about 50:1 to about 75:1

In one embodiment, the ratio of moles of Si to the moles of Ga in the galloaluminosilicate zeolite can be at least about 30:1, at least about 60:1, at least about 120:1, at least about 200:1. In another embodiment, the ratio of moles of Si to the moles of Ga in the galloaluminosilicate zeolite can be varied from about 30:1 to about 300:1, from about 30:1 to about 200:1, from about 30:1 to about 120:1, or from about 30:1 to about 75:1.

In one embodiment, the ratio of the moles of Si to the moles of Al in the galloaluminosilicate zeolite can be at least about 10:1, at least about 20:1, at least about 30:1, at least about 40:1, at least about 50:1, at least about 75:1. In another embodiment, the ratio of the moles of Si to the moles of Al in the galloaluminosilicate zeolite can be varied from about 10:1 to about 100:1, from about 10:1 to about 75:1, from about 10:1 to about 50:1, from about 10:1 to about 40:1, or from about 10:1 to about 30:1.

The modifiers can be added to the zeolite by known methods in the art including incipient wetness impregnation; wet impregnation; deposition methods including physical, chemical, vapor and atomic deposition means; and other synthetic means well known in the art.

In addition to the zeolite with the modifier(s), the solid catalyst component also contains at least one Group VIII metal alloyed with at least one transition metal. Alloyed metals are commonly referred to as bimetallic or multimetallic materials (surfaces). A catalyst containing alloyed metals often shows electronic and chemical properties that are distinctly different from those of the parent metals. The catalyst shows enhanced selectivity, activity and stability. Generally, it is believed that two factors contribute to the modification of the electronic and chemical properties of a metal in a bimetallic or multimetallic material (surface). First, the formation of the hetero-atom bonds changes the electronic environment of the metal surface, giving rise to modifications of its electronic structure through the ligand effect. Second, the geometry of the bimetallic or multimetallic material (surface) is typically different from that of the parent metals, e.g. the average metal-metal bond lengths change. This gives rise to the strain effect that is known to modify the electronic structure of the metal through changes in orbital overlap.

Specific examples of the Group VIII metals include, but are not limited to, platinum, palladium, silver, gold, rhodium, ruthenium, and iridium. The Group VIII metal can be added to the zeolite such as the spray dried material and/or support by known methods in the art including incipient wetness impregnation; wet impregnation; deposition methods including physical, chemical, vapor and atomic deposition means; and other synthetic means well known in the art. The Group VIII metal may be in the form of readily available compounds such as the metal salts with counter-anions such as nitrates, acetates, halides, oxy-halides, sulfates, nitrides, sulfides and the like.

Specific examples of the transition metals include, but are not limited to, titanium, vanadium, chromium, manganese, iron, cobalt, nickel, copper, zinc, molybdenum, and tungsten. The transition metal may be added to the zeolite such as the spray dried material and/or support by know methods in the art including incipient wetness impregnation; wet impregnation; deposition methods including physical, chemical, vapor and atomic deposition means; and other synthetic means well know in the art. The transition metal may be in the form of readily available compounds such as the metal salts with counter-anions such as nitrates, acetates, halides, oxy-halides, sulfates nitrides, sulfides and the like.

In one embodiment, the solid catalyst components include Pt, Pd, or Pt and Pd as one of the Group VIII metals; and Ni, Co, or Ni and Co as one of the transition metals. Specific examples include PtNi, PtCo, PtNiCo, PdNi, PdCo, PtNiCo, PtPdNi, PtPdCo and PtPdNiCo.

A lattice constant can be calculated from 2 θ of a Group VIII/Transition metal alloy peak observed in an X-ray diffraction (XRD) pattern of an alloy metal prepared using an arc-melting method (Gasteiger, H. A. et al., LEIS and AES on sputtered and annealed polycrystalline Group VIII/Transition metal bulk alloys, Surface Science, 293 (1993), pp. 67-80). Also, a method of calculating an alloy ratio of Group VIII metal and transition metal from the lattice constant is disclosed in the above literature.

Based on this method, an alloy ratio of Group VIII metal and transition metal is calculated in the present application. In order to maximize the multimetallic effects, it is advantageous that the Group VIII metal atom corresponds to the transition metal atom in a ratio from about 10:1 to about 1:10. In one embodiment, the ratio of Group VIII metal to transition metal can be changed from about 5:1 to about 1:5. In another embodiment, the ratio of Group VIII metal to transition metal can be changed from about 3:1 to about 1:3.

In general, the solid catalyst component contains from about 0.01 weight % to about 2.0 weight % of the multimetallic (e.g. bimetallic or trimetallic) component. In one embodiment, the solid catalyst component contains from about 0.02 weight % to about 1.0 weight % of the multimetallic component. In another embodiment, the solid catalyst component contains from about 0.05 weight % to about 0.5 weight % of the multimetallic component.

These multimetallic components can be incorporated with the zeolite by any of the conventional techniques known for this purpose, such as wet impregnation, incipient wetness impregnation, ion exchange, framework substitution, physical vapor deposition, chemical vapor deposition, atomic layer deposition, or physical bending.

In one embodiment, multimetallic component incorporation is by ion exchange. Because the zeolites are highly selective, a salt of the multimetallic component can be chosen to enhance uptake of the multimetallic component. For example, tetraammine salts (e.g. chlorides, nitrates or hydroxides) of the multimetallic component can be prepared and used to incorporate the multimetallic component into the zeolite. The multimetallic component may also be incorporated using a sequential process, sometimes referred to as "double dip", in which the zeolite is exposed to the salt solution, followed by drying and calcining to fix the multimetallic component in the zeolite, and the process is repeated until the desired amount of the multimetallic component has been incorporated into the zeolite.

In general, the solid catalyst component has an extrudate diameter of between about 0.08 mm and about 2.5 mm. When used in a fixed-bed reactor the extrudate diameter can be at least about 0.5 mm with an upper limit of about 1.8 mm. The catalyst has an average micropore diameter of about 7.4 Å when using zeolite X or Y.

The particle size of the solid catalyst component may be smaller in a fluidized bed reactor such that the catalyst component may be readily fluidized in the reactor. In general, the solid catalyst component should have a particle size from about 10 to about 150 microns. To facilitate the separation of the catalyst component from the filler component of a filled mixed waste plastic, it will be advantageous to select a solid catalyst component which is relatively uniform in particle size (i.e., one that does not have a high proportion of particles that are substantially different in size from the average particle size).

A method of preparing a solid catalyst component comprising a modified zeolite and a Group VIII/Transition metal alloy according to an embodiment of the presently disclosed and claimed inventive concept(s) will now be described.

First, a Group VIII metal precursor and a transition metal precursor are dissolved in a solvent such as water, respectively. The Group VIII metal precursor and the transition metal precursor can be in the form of salts capable of being easily dissociated in water, for example, chlorides, sulfides, nitrides of Group VIII metal and transition metal, respectively.

The Group VIII metal precursor and the transition metal precursor can be weighed such that a molar ratio of the Group VIII metal precursor and the transition metal precursor is from about 10:1 to about 1:10. If the molar ratio of the Group VIII metal precursor and the transition metal precursor deviates from the above range, a molar ratio of the Group VIII metal and transition metal in the Group VIII/Transition Metal alloy catalyst component to be formed may be also deviated from a range of about 10:1-1:10 in many cases. In one embodiment, the Group VIII metal precursor and the transition metal precursor can be weighed such that a molar ratio of the Group VIII metal precursor and the transition metal precursor is from about 5:1 to about 1:5. In another embodiment, the Group VIII metal precursor and the transition metal precursor can be weighed such that a molar ratio of the Group VIII metal precursor and the transition metal precursor is from about 3:1 to about 1:3. The water used can be deionized water.

Next, the solution of the Group VIII metal precursor in water is mixed with the solution of the transition metal precursor in water to obtain a metal salt solution.

A modified zeolite for supporting the active components of Group VIII metal and transition metal is dispersed in a solvent to obtain a zeolite slurry. The modified zeolite can be prepared by incorporating a modifier into a zeolite. The modifier is phosphorus, boron, or phosphorus and boron. An additive can also be added as a modifier in addition to phosphorus, boron, or phosphorus and boron. The additive is selected from the group consisting of gallium, zinc, zirconium, niobium, tantalum and combinations thereof. The modifier can be incorporated into the zeolite by any suitable method or means known in the art for incorporating elements into a substrate material.

The phosphorus, boron, and additive compounds can be incorporated into the zeolite by individual incorporation steps by which the compounds are individually and separately incorporated into the zeolite or by any combination of simultaneous incorporation steps by which any two or more of the compounds are incorporated into the zeolite.

In one embodiment, a single step method of incorporating the phosphorus, boron and additive into the zeolite is by using an aqueous impregnation solution into which is dissolved suitable compounds containing phosphorus, boron, and the additive. This incorporation method more specifically can be any standard incipient wetness technique known in the art.

The solvent in which the modified zeolite to be dispersed may be an organic solvent that can also function as a reducing agent. In one embodiment, the solvent is an organic solvent containing a hydroxy (OH) group. In another embodiment, the solvent is an organic solvent containing two or more OH groups. In yet another embodiment, the organic solvent is ethylene glycol. A weight ratio of the organic solvent used in the zeolite slurry and the water used in the metal salt solution may be in the range from about 1:0.4 to about 1:0.6.

The metal salt solution is contacted with the zeolite slurry to obtain a mixture, and then the pH of the mixture is adjusted to form a product. Thus, the active components are reduced during the reduction process, while being supported on the zeolite. The pH of the mixture can be adjusted to about 11-13 by using a pH adjusting agent. Specific examples of the pH adjusting agents include, but are not limited to, NaOH, $NH_4OH$, KOH, $Ca(OH)_2$ or combinations thereof.

Subsequently, the product after the pH adjustment is slowly heated to form catalyst particles. The temperature is raised from room temperature to a final temperature of about 50-80° C. for about 20-40 minutes and then maintained at the final temperature for about 1-5 hours. The formed catalyst particles are isolated using a conventional method, for example, filtration or centrifuging, and then washed.

The catalyst particles can also be obtained in other alternative ways. For example, the solution of the Group VIII metal precursor in water is contacted with the zeolite slurry to form a Group VIII metal zeliote mixture. A pH adjusting agent is added into the Group VIII metal zeolite mixture to form a Group VIII metal zeolite product. The pH adjusting agent can be the same as those described previously. Then the Group VIII metal zeolite product is slowly heated to form a Group VIII metal zeolite catalyst precursor. The temperature is raised from room temperature to a final temperature of about 50-80° C. for about 20-40 minutes and then maintained at the final temperature for about 1-5 hours. The formed Group VIII metal zeolite catalyst precursor is isolated using a conventional method, for example, filtration or centrifuging, and then washed. Next, the Group VIII metal zeolite catalyst precursor is dried in air at a temperature of about 110° C.

Next, the dried Group VIII metal zeolite catalyst precursor is dispersed in a solvent to obtain Group VIII metal zeolite slurry. The solvent in which the Group VIII metal zeolite catalyst precursor to be dispersed may be an organic solvent that can also function as a reducing agent. The solvent can be the same one used to form a zeolite slurry described previously.

The solution of the transition metal precursor in water is contacted with the Group VIII metal zeolite slurry to form a mixture. A pH adjusting agent is added into the mixture to form a product. The pH adjusting agent can be the same as those described previously. Subsequently, the product after the pH adjustment is slowly heated to form catalyst particles. The temperature is raised from room temperature to a final temperature of about 50-80° C. for about 20-40 minutes and then maintained at the final temperature for about 1-5 hours. The formed catalyst particles are isolated using a conventional method, for example, filtration or centrifuging, and then washed.

Similarly, the solution of the transition metal precursor in water is contacted with the zeolite slurry to form a transition metal zeliote mixture. The pH adjusting agent is added into the transition metal zeolite mixture to form a transition metal zeolite product. Then the transition metal zeolite product is slowly heated to form a transition metal zeolite catalyst precursor. The temperature is raised from room temperature to a final temperature of about 50-80° C. for about 20-40 minutes and then maintained at the final temperature for about 1-5 hours. The formed transition metal zeolite catalyst precursor is isolated using a conventional method, for example, filtration or centrifuging, and then washed. Next, the transition metal zeolite catalyst precursor is dried in air at a temperature about 110° C.

The transition metal zeolite catalyst precursor is dispersed in the solvent to obtain transition metal zeolite slurry. The solution of the Group VIII metal precursor in water is contacted with the transition metal zeolite slurry to form a mixture. The pH adjusting agent is added into the mixture to form a product. Subsequently, the product after the pH adjustment is slowly heated to form catalyst particles. The temperature is raised from room temperature to a final temperature of about 50-80° C. for about 20-40 minutes and then maintained at the final temperature for about 1-5 hours. The formed catalyst particles are isolated using a conventional method, for example, filtration or centrifuging, and then washed.

Finally, the washed catalyst particles are heat-treated to prepare the solid catalyst component. The heat-treatment has two steps. First, the catalyst particles are dried in air at about 110° C. Second, the dried catalyst particles are calcinated in air at a temperature in the range from about 250 to about 500° C. In one embodiment, the dried catalyst particles can be calcinated at about 400° C. in air. This calcination process results in the formation of the alloy in which the Group VIII metal(s) and the transition metal(s) are intimately mixed at the atomic level so that there are no atomic clusters of one distinct Group VIII metal or one distinct transition metal. At the atomic level a Group VIII metal atom is always in close atomic proximity (nearest atomic neighbor) to a transition metal atom, continuously through-out the alloy composition. The heat-treatment time may be varied from about 5 minutes to about 2 hours, depending on the amount of the catalyst to be formed.

The solid catalyst component can be used in different catalytic reactions. One specific example of using the solid catalyst component is to convert mixed waste plastics into low molecular weight organic compounds. The mixed waste plastics used in the presently disclosed and claimed inventive concept(s) can be selected from a wide range of plastics and polymers including hydrocarbon and oxygenated hydrocarbon plastic resin materials, halogenated plastics, thermoset polymers, thermoplastic polymers, and combinations thereof.

The solid catalyst component has great utility with hydrocarbon polymers including, especially, polyolefins such as polyethylene, polypropylene, polybutene, and polymers and copolymers of these and other unsaturated hydrocarbon monomers. Polyvinyl aromatics such as polystyrene e.g. foamed polystyrene, and poly (paramethyl-styrene) and copolymers e.g. with cross-linking comonomers such as divinylbenzene (DVB) can also be recovered using the solid catalyst component as oxygenated polymers such as polyesters e.g. polyethylene terephthalate (PET), polyacrylates e.g. poly (methyl methacrylate), polycarbonates and other such polymers.

Any thermoset polymer can also be employed in the presently disclosed and claimed inventive concept(s), including not only polymers which are already crosslinked but also thermosettable or partially thermoset materials which would ordinarily be subject to crosslinking upon heating. A thermoset polymer in this context thus means a polymer which cannot be remelted or remolded without destroying its original characteristics, or a polymer subject to crosslinking reactions at temperatures necessary to induce flow. Examples of suitable thermoset resins include, but are not limited to, epoxy resins, melamine resins, phenolic resins (e.g., phenol-formaldehyde resins), urea resins, amino resins, unsaturated polyester resins, melamine-formaldehyde resins, allylic resins, thermoset polyimides, as well as mixtures thereof.

Thermoset polymers derived from an isocyanate-containing reactant are particularly advantageous for use, as the process of this presently disclosed and claimed inventive concept(s) enables the preparation of monomeric or oligomeric organic amines from such polymers in relatively high yield. Amines have high value as chemical intermediates and may be used to prepare isocyanates, amides, amine salts, azo compounds, ureas, carbamates, and other useful types of compounds. This result was unexpected, since the catalytic cracking of polymeric materials has heretofore given predominantly hydrocarbons (i.e., compound containing only carbon and hydrogen) and since difficulties with catalyst deactivation or undesired side reactions are commonly encountered when heteroatom-containing substrates are employed. Illustrative thermoset polymers derived from isocyanate-containing reactants include, for example, polyurethanes (polymers obtained by reacting di- or polyisocyanates with hydroxy-containing reactants such as polyether polyols, polyester polyols, glycols, and the like), polyureas (polymers obtained by reacting di- or polyisocyanates with amine-containing reactants such as amine-tipped polyether polyols, amine chain extenders or curatives, and the like), polyisocyanurates (polymers obtained by trimerization of an isocyanate), as well as hybrid or mixed type thermoset resins such as polyurethane-modified polyisocyanurates (polymers obtained by reacting a portion of the isocyanate groups of a di- or polyisocyanate with an hydroxy-containing reactant and trimerizing another portion of the isocyanate groups). Polymers of the latter type are well-known and are described, for example, in U.S. Pat. Nos. 4,965,038, 4,731,427, and 5,059,670. The thermoset polymers derived from isocyanate-containing reactants may be in various forms such as flexible foams, rigid foams, microcellular elastomers, coatings, adhesives, sealants, and solid elastomers.

A distinct advantage of the presently disclosed and claimed inventive concept(s) is that mixtures of various thermoset polymers can be utilized as the feed. Another advantage of the presently disclosed and claimed inventive concept(s) is that thermoplastic polymers such as polyethylene, polypropylene, polystyrene, polyamide (nylon), polyvinyl chloride, polyethylene terephthalate, polybutylene terephthalate, polymethyl methacrylate, polyphenylene oxide, styrene/maleic anhydride copolymer, ABS and MBS resins, thermoplastic polyurethanes, and elastomers and rubbers such as natural rubbers, polybutadiene, polyolefin rubbers, butyl rubbers, neoprenes, polyisobutylene, silicoane rubbers, nitrile rubbers, styrene-butadiene or styrene-isoprene rubbers and acrylate rubbers can also be employed as admixtures with the thermoset polymer, since such thermoplastics and rubbers will be successfully cracked or converted to useful volatile organic compounds simultaneous with transformation of the thermoset polymer. Moreover, cellulose-based organic wastes such as paper or wood will not adversely affect the process of this presently disclosed and claimed inventive concept(s). Thus, the need for tedious and expensive separation steps prior to introduction of the raw material feed into the reactor is minimized.

Another advantage of the process of this presently disclosed and claimed inventive concept(s) is the ability to handle a feed stream containing highly filled thermoset polymers, since the filler or reinforcement in the feed stream is effectively separated from the volatile organic products derived from the polymer and recovered in a form whereby it may be subsequently reused as a filler to improve the physical and mechanical properties of virgin polymers. Surprisingly, the presence of the filler in the process does not adversely affect the yields of volatile organic compounds obtainable in the process or affect the activity of the solid catalyst component. Typically, a filled thermoset polymer will contain up to about 50 or to about 75% by weight of one or more fillers. The fillers may be any of the conventional additives incorporated into thermoset resin, including, for example, glass fibers (strands, filament yarns, staple fibers, staple yarns, woven or unwoven mats, long or short fibers), glass flakes, glass spheres, asbestos, calcium carbonates, dolomite, silicates, talc, kaolin, mica, feldspar, silicas, wollastonite, barium sulfate, alumina, and other mineral or inorganic fillers and reinforcements. Thermoset polymers containing carbon-based fillers and reinforcements such as carbon black, carbon fibers, graphite, synthetic reinforcing fibers such as aromatic amide polymers (e.g., "KEVLAR®", a product of E. I. du Pont de Nemours) can also be readily processed and reclaimed by the process of this presently disclosed and claimed inventive concept(s).

The process of this presently disclosed and claimed inventive concept(s) is especially useful for processing the "fluff" obtainable from scrapped automobiles. "Fluff" is the mostly nonmetallic material recovered from cars and trucks and includes glass, fibers, foams (especially polyurethane foams), and various plastics and other resins.

Before the mixed waste plastics are introduced into a reactor, they may be shredded or otherwise reduced to a particulate state. A variety of size reduction means are well known in the art and any of these means can be employed in the process of this presently disclosed and claimed inventive concept(s). The size reduction means include, but are not limited to, a shredder, a chopper, a grinding apparatus or combinations thereof, which can be employed in a sequential, parallel, or tandem manner. For example, the thermoset polymer, which may initially take the form of large articles such as automotive body panels, tires, gaskets, bushings, shower stalls, boat hulls, furniture or automotive seat cushions, or foamed insulation from appliances or building construction or demolition, can be first subjected to a coarse shredding, chopping, or crushing operation. The coarsely shredded or chopped thermoset polymer can subsequently be grounded, pulverized, or further crushed to yield the fine particles required.

Additional pretreatment steps can be incorporated, if desired, such as flotation, washing, drying, separation, or the like. Non-polymeric materials such as metals, glass, wood, paper, cloth and the like are removed from this separation process. The separation process can be accomplished using conventional means such as a magnetic separation device or a classification device separating according to density such as a shaking table or a flotation tank. The separation process can be carried out before or after the size reduction step.

In any case, it is important that the mixed waste plastics are in a form of relatively small particles when contacted with the solid catalyst component in the reactor in order to achieve optimum results from the process of this presently disclosed and claimed inventive concept(s). Small particles are desirable in order to maximize the surface area/volume ratio of the particles, thus increasing the rate at which the plastic particles will be converted in the reactor, and also to ensure that the plastic particles do not rapidly "settle out" in a fluidized bed reactor from the solid catalyst component (which optimally also is relatively small in size). The average diameter of the mixed waste plastic particles should therefore be less than about 1 cm. In one embodiment, the average diameter of the mixed waste plastic particles is less than about 1 mm. In another embodiment, the average diameter of the mixed waste plastic particles is less than about 0.5 mm.

Example of a process of converting mixed waste plastics into low molecular weight organic compounds using the solid catalyst component is now described. Referring to FIG. 1, a high level schematic diagram of converting mixed waste plastics into low molecular weight organic compounds is shown.

If a mixed waste plastic contains polyvinyl chloride (PVC), polyvinylidene dichloride (PVDC) and other halogenated plastics, it will be fed through line 1 into a thermal reactor 2. The pyrolysis of the halogenated plastics can be performed in the reactor 2 using a two-step temperature program under atmospheric pressure. The two-step temperature program can eliminate hydrogen chloride from the reactor and the formation of chlorinated hydrocarbons in the products. Thus, the pyrolysis produces the plastics without halogenated hydrocarbons (less than about 15 ppm).

In the first step of the pyrolysis, the temperature is increased from room temperature to a temperature between about 300° C. and about 330° C. for at least about two hours. The evolved HCl is carried out from the top of the reactor with an inert carrier gas (e.g., $N_2$) through line 4. In the second step, the temperature is subsequently increased to a final pyrolysis temperature from about 400° C. to about 450° C. and kept until the end of the pyrolysis.

The mixed waste plastic after the pyrolysis is fed into a catalytic fluidized bed reactor 7 along line 3. A mixed waste plastic without PVC, PVCD and other halogenated plastics can be fed into a catalytic fluidized bed reactor 7 along line 1' directly without the pyrolysis step. The mixed waste plastic particles may be admixed with or suspended in a hydrocarbon-based carrier (preferably liquid in form) such as crude oil, recycled lubricating oils, waste cooking oils, melted thermoplastic polymers, and the like prior to introduction into the reactor. The hydrocarbon-based carrier will be catalytically cracked into useful volatile organic compounds.

The mixed waste plastics particles are heated with the solid catalyst component particulates in the fluidized bed reactor 7 at a temperature effective to convert all or part of the polymeric portion of the particles into a volatile organic component. In general, this temperature will be varied from about 450° C. to about 750° C. In one embodiment, the temperature will be varied from about 500° C. to about 700° C.

The reactor velocity must be sufficient to maintain the catalyst and the polymer particles present in random motion. The velocity should be high enough to effectively carry over through line 8 a first stream comprising a volatile organic component generated in the process of this presently disclosed and claimed inventive concept(s). A carrier gas may be introduced into the reactor 7 in order to maintain the desired reactor velocity. The carrier gas, which may be introduced through line 6, for example, can be an inert gas such as nitrogen or helium; one or more light hydrocarbons such as methane, ethane, butanes or the like; steam or some combination or mixture thereof.

The catalyst is deployed in a fluidized bed reactor, preferably a dense or "fluffed" fluidized bed so as to minimize the distance between the plastic particles and the catalyst particles and to prevent the unconverted plastic particles from settling too rapidly to the bottom of the reactor, while at the same time promoting effective, rapid, and intimate mixing of the components present in the reactor. Methods and equipment for using a zeolite-type catalyst in a fluid bed reactor are well known and are described, for example, in Venuto et al., Fluid Catalytic Cracking With Zeolite Catalysts, Marcel Dekker (1979); Sterka, "Fluid Catalytic Cracking", in Chemical and Process Technology Encyclopedia, Considine, Ed., McGraw-Hill (1974) pp. 505-509; and Anonymous, "Fluidized Bed Operations", Ibid., pp. 509-511. The average concentration of catalyst particles within the fluidized bed reactor can be about 5 to about 15 pounds per cubic foot. Since at least a portion of the mixed waste plastic particles are likely to be larger or heavier than the catalyst particles, it is desirable to introduce the mixed waste plastic particles into the reactor at a point near the top of the fluidized catalyst bed reactor.

If desired, a catalyst separator 10 can be positioned such that products exiting the reactor 7 through line 8 are treated so as to remove any catalyst that may have been inadvertently carried over and to return this catalyst to the reactor. Catalyst separator 10 is suitably comprised of one or more cyclone vessels of the type commonly employed in fluid catalytic cracking processes. In addition to separating or disengaging the particulate catalyst from the exiting product stream, it is also desirable to operate the catalyst separator 10 so as to separate and return to the reactor 7 other particulate materials such as filler or mixed waste plastic particles which may be present. The particulate catalyst along with other particulate materials from the separator 10 is fed into a catalyst regenerator 15 through line 14.

Treatment of filled mixed waste plastic in accordance with this presently disclosed and claimed inventive concept(s) will generate not only a volatile organic component but also coke (a non-volatile carbonaceous residue having a high ratio of carbon to hydrogen), filler, and a spent catalyst.

The filler may vary from very fine to very coarse in size, depending upon the type of filler present initially in the mixed waste plastic and the degree of size attrition or reduction experienced during processing. The fine filler component may typically exit from the catalyst separator 10 together with the volatile organic component while the coarse filler component will tend to remain with the catalyst in the fluidized bed rector. Catalyst separator 10 may be configured and operated so as to achieve the desired separation of the filler component exiting reactor 7.

The coke will typically be deposited on the surfaces of the spent catalyst and the filler. The spent catalyst will be lower in activity than the fresh catalyst. To regenerate the spent catalyst and to remove the coke from the spent catalyst and the filler so that the catalyst and filler may be desirably reused or recycled, a second stream comprising the spent catalyst, coarse filler component and coke is withdrawn from the reactor 7 through line 9 and passed into the catalyst regenerator 15, wherein the stream is heated in the presence of oxygen, or air, or a mixture of oxygen and other inert gases (supplied through line 17) at a temperature effective to convert the coke to carbon dioxide and water and to regenerate the catalyst. In one embodiment, the temperature in the regenerator 15 is from about 450° C. to about 900° C. In another embodiment, the temperature in the regenerator 15 is from about 600° C. to about 750° C. An advantage of this process is that the heat generated in the catalyst regeneration step can be used in other steps of the process requiring the input of heat such as the fluidized bed reactor. The overall process is thus remarkably energy efficient. Gaseous products are removed through line 25, while the particulate product (regenerated catalyst and filler, both of which are essentially free of coke) is withdrawn via line 16. The particulate product is subsequently treated in a separator 18 so as to fractionate the particulate product on the basis of size, weight, or density, thus separating the regenerated catalyst from a fine reclaimed filler component and a coarse reclaimed filler component. The separator 18 may suitably comprise one or more cyclone vessels, sieves, filters, or the like. The separation means are chosen such that the particles present are separated on the basis of both weight and size. The fine reclaimed filler component will comprise that portion of the filler component (withdrawn through line 26) which is smaller in size and/or lighter in weight than the regenerated catalyst (which typically will have an average particle size of from about 50 to about 150 microns). The coarse reclaimed filler component (withdrawn through line 19) will comprise the portion of the filler component which is larger in size and/or heavier than the regenerated catalyst. A key advantage of the process of this presently disclosed and claimed inventive concept(s) is that the filler which is recovered is essentially free of any residual coke and will be in a form suitable for immediate reuse as filler in a filled thermoset or thermoplastic resin.

The regenerated catalyst is fed back into the fluidized bed reactor 7 through line 20 so as to replenish the supply of active catalyst in the reactor. The catalyst regeneration process is carried out in a continuous manner. The regenerated catalyst will contain a minor amount of filler comprising particles comparable in size and weight to the catalyst particles. These filler particles will not tend to accumulate, however, due to their proclivity to gradually attrite during the physical handling steps of the process, which eventually will reduce the size of said particles to an extent as to permit facile separation from the catalyst particles. For this reason, the solid catalyst component particles should be selected such that they have an exceptionally high degree of resistance towards attrition.

The volatile organic hydrocarbon component disengaged from catalyst separator 10 passes through line 11 into a product separator 12 and is separated into the desired hydrocarbon product streams. The nature of these hydrocarbon product streams will vary depending upon the composition of the mixed waste plastic, the type of catalyst, and the operating conditions within the reactor, among other factors.

In one particular embodiment as shown in FIG. 1, at least a portion of lights, gases and olefins 13 of the volatile organic hydrocarbon component is separated from the rest of the product stream 21 in the product separator 12. Olefins include, but are not limited to, ethene, propene, butenes, and the like. The rest of the product stream include, but are not limited to, benzene, toluene, xylene and other hydrocarbons.

Suitable methods for separating lights, gases and olefins from other volatile organic carbon products are known to those of ordinary skill in the art. For example, lights, gases and olefins can be separated from other volatile organic carbon products by cooling product stream to a temperature that lies between the boiling points of the lights, gases and olefins, and the other volatile organic hydrocarbon products. Optionally, the product separator 12 can comprise a multi-stage separator. For example, the product separator 12 can comprise a first separator that directly separates the gaseous products (including olefins) from liquid products (e.g., high boiling point aromatics such as benzene, toluene, xylene, etc.), and a second separator that separates at least a portion of the olefins from other gaseous products (e.g., gaseous aromatics, $CO_2$, CO, etc.). The methods and/or conditions used to perform the separation can depend upon the relative amounts and types of compounds present in the fluid hydrocarbon product stream, and one of ordinary skill in the art will be capable of selecting a method and the conditions suitable to achieve a given separation given the guidance provided herein.

The portion of the lights, gases and olefins 13 are recycled back to the feed stream after passing a compressor 22 through line 23. Recycling olefins can increase the amount of aromatic compounds such as benzene, toluene, xylene and the like present in the product stream, relative to the amount of aromatic compounds that would be present in the product stream in the absence of recycling but under essentially identical conditions.

In some embodiments, co-feeding olefins to the reactor can result in an increase in aromatic compounds in the reaction product of at least about 5%, at least about 10%, or at least about 20%, relative to an amount of aromatic compounds that would be produced in the absence of the olefin co-feed. Olefins may be reacted with hydrocarbonaceous material in any suitable ratio. In some embodiments, the ratio of the mass of carbon within the hydrocarbonaceous material to the mass of carbon in the olefins in a mixture of hydrocarbonaceous material and olefins that is to be reacted is between about 2:1 and about 20:1, between about 3:1 and about 10:1, or between about 4:1 and about 5:1.

It is, of course, not possible to describe every conceivable combination of the components or methodologies for purpose of describing the disclosed information, but one of ordinary skill in the art can recognize that many further combinations and permutations of the disclosed information are possible. Accordingly, the disclosed information is intended to embrace all such alternations, modifications and variations that fall within the spirit and scope of the appended claims. Furthermore, to the extent that the term "includes," "has," "involve," or variants thereof is used in either the detailed description or the claims, such term is intended to be inclusive in a manner similar to the term "comprising" as "comprising" is interpreted when employed as a transitional word in a claim.

All references, articles, patents, and pending patent applications cited herein are hereby expressly incorporated herein in their entireties by reference.

What is claimed is:

1. A method of preparing a solid catalyst component, comprising:
    (a) dissolving a noble metal precursor and a transition metal precursor, respectively into water to form solutions, and mixing the obtained solutions with each other to obtain a metal salt solution, wherein the noble metal precursor comprises one or more salts comprising a noble metal selected from the group consisting of silver, gold, rhodium, iridium, and combinations thereof;
    (b) mixing a modified zeolite with a solvent to obtain a zeolite slurry, wherein the zeolite is selected from the group consisting of chabazite, erionite, faujasite, ferrierite, mordenite, offretite, TEA-mordenite, zeolite A, zeolite beta, zeolite boron beta, zeolite L, zeolite X, zeolite Y, zeolite ZK-5, Breck-6, HZSM-5, ITQ-1, ITQ-21, MCM-22, MCM-36, MCM-39, MCM-41, MCM-48, PSH-3, SUZ-4, EU-1, SAPO-5, SAPO-11, SAPO-34, (S)AlPO-31, SSZ-23, SSZ-32, TUD-1, VPI-5, ZSM-4, ZSM-5, ZSM-8, ZSM-11, ZSM-12, ZSM-20, ZSM-21, ZSM-22, ZSM-23, ZSM-34, ZSM-35, ZSM-38, ZSM-48, ZSM-50, ZSM-57, and combinations thereof, and wherein the modified zeolite is modified with a modifier selected from the group consisting of (a) phosphorous, (b) phosphorous and boron, (c) an additive selected from the group consisting of gallium, zinc, zirconium, niobium, tantalum, and combinations thereof, and (d) combinations thereof;
    (c) contacting the metal salt solution with the zeolite slurry to form a mixture;
    (d) adjusting a pH of the mixture to obtain a product;
    (e) heating the product to form catalyst particles;
    (f) isolating and washing the catalyst particles; and
    (g) heat-treating the catalyst particles obtained from the step (f) to form the solid catalyst component.

2. The method of claim 1, wherein the step of contacting the metal salt solution with the zeolite slurry of step (c) includes wet impregnation, incipient wetness impregnation, ion exchange, framework substitution, physical vapor deposition, chemical vapor deposition, atomic layer deposition, physical bending, and combinations thereof.

3. The method of claim 1, wherein the transition metal precursor comprises one or more salts comprising a transition metal selected from the group consisting of titanium, vanadium, chromium, manganese, iron, cobalt, nickel, copper, zinc, molybdenum, tungsten, and combinations thereof.

4. The method of claim 1, wherein the solvent in step (b) is an organic solvent containing at least one hydroxy functional group.

5. The method of claim 1, wherein the modified zeolite is further modified with at least one additive selected from the group consisting of gallium, zinc, zirconium, niobium, tantalum, and combinations thereof.

6. The method of claim 1, wherein the pH of the product in step (d) is adjusted to a range of from about 11 to about 13.

7. The method of claim 1, wherein the pH of the product in step (d) is adjusted using a pH adjuster selected from the group consisting of NaOH, NH$_4$OH, KOH, Ca(OH)$_2$, and combinations thereof.

8. The method of claim 1, wherein heating the product in step (e) comprises: (i) raising the temperature of the product to about 50 to 80° C. over about 20 to 40 minutes; and (ii) maintaining the temperature at about 50 to 80° C. for about 1 to 5 hours.

9. A method of preparing a solid catalyst component, comprising:
(a) dissolving a noble metal precursor in water to form a noble metal solution, wherein the noble metal precursor comprises one or more salts comprising a noble metal selected from the group consisting of silver, gold, rhodium, iridium, and combinations thereof;
(b) mixing a modified zeolite with a solvent to obtain a zeolite slurry, wherein the zeolite is selected from the group consisting of chabazite, erionite, faujasite, ferrierite, mordenite, offretite, TEA-mordenite, zeolite A, zeolite beta, zeolite boron beta, zeolite L, zeolite X, zeolite Y, zeolite ZK-5, Breck-6, HZSM-5, ITQ-1, ITQ-21, MCM-22, MCM-36, MCM-39, MCM-41, MCM-48, PSH-3, SUZ-4, EU-1, SAPO-5, SAPO-11, SAPO-34, (S)AlPO-31, SSZ-23, SSZ-32, TUD-1, VPI-5, ZSM-4, ZSM-5, ZSM-8, ZSM-11, ZSM-12, ZSM-20, ZSM-21, ZSM-22, ZSM-23, ZSM-34, ZSM-35, ZSM-38, ZSM-48, ZSM-50, ZSM-57, and combinations thereof, and wherein the modified zeolite is modified with a modifier selected from the group consisting of (a) phosphorous, (b) phosphorous and boron, (c) an additive selected from the group consisting of gallium, zinc, zirconium, niobium, tantalum, and combinations thereof, and (d) combinations thereof;
(c) contacting the noble metal solution with the zeolite slurry to form a noble metal zeolite mixture;
(d) adjusting a pH of the noble metal zeolite mixture to obtain a noble metal zeolite product;
(e) heating the noble metal zeolite product to form a noble metal zeolite catalyst precursor;
(f) isolating and washing the noble metal zeolite catalyst precursor;
(g) heat-treating the noble metal zeolite catalyst precursor obtained from step (f) to dry the isolated noble metal zeolite catalyst precursor;
(h) dispersing the dried noble metal zeolite catalyst precursor of step (g) in a solvent to form a noble metal zeolite slurry;
(i) dissolving a transition metal precursor in water to form a transition metal solution;
(j) contacting the noble metal zeolite slurry with the transition metal solution to form a noble and transition metal zeolite mixture;
(k) adjusting a pH of the noble and transition metal zeolite mixture to obtain a noble and transition metal zeolite product;
(l) heating the noble and transition metal zeolite product to form noble and transition metal zeolite catalyst particles;
(m) isolating and washing the noble and transition metal zeolite catalyst particles; and
(n) heat-treating the catalyst particles obtained from step (m) to form the solid catalyst component.

10. The method of claim 9, wherein the transition metal precursor comprises one or more salts comprising a transition metal selected from the group consisting of titanium, vanadium, chromium, manganese, iron, cobalt, nickel, copper, zinc, molybdenum, tungsten, and combinations thereof.

11. The method of claim 9, wherein the solvent in at least one of steps (b) and (h) is an organic solvent containing at least one hydroxy functional group.

12. The method of claim 9, wherein the modified zeolite is further modified with at least one additive selected from the group consisting of gallium, zinc, zirconium, niobium, tantalum, and combinations thereof.

13. The method of claim 9, wherein the pH of the product in at least one of steps (d) and (k) is adjusted to a range of from about 11 to about 13.

14. A method of preparing a solid catalyst component, comprising:
(a) dissolving a transition metal precursor in water to form a transition metal solution;
(b) mixing a modified zeolite with a solvent to obtain a zeolite slurry, wherein the zeolite is selected from the group consisting of chabazite, erionite, faujasite, ferrierite, mordenite, offretite, TEA-mordenite, zeolite A, zeolite beta, zeolite boron beta, zeolite L, zeolite X, zeolite Y, zeolite ZK-5, Breck-6, HZSM-5, ITQ-1, ITQ-21, MCM-22, MCM-36, MCM-39, MCM-41, MCM-48, PSH-3, SUZ-4, EU-1, SAPO-5, SAPO-11, SAPO-34, (S)AlPO-31, SSZ-23, SSZ-32, TUD-1, VPI-5, ZSM-4, ZSM-5, ZSM-8, ZSM-11, ZSM-12, ZSM-20, ZSM-21, ZSM-22, ZSM-23, ZSM-34, ZSM-35, ZSM-38, ZSM-48, ZSM-50, ZSM-57, and combinations thereof, and wherein the modified zeolite is modified with a modifier selected from the group consisting of (a) phosphorous, (b) phosphorous and boron, (c) an additive selected from the group consisting of gallium, zinc, zirconium, niobium, tantalum, and combinations thereof, and (d) combinations thereof;
(c) contacting the transition metal solution with the zeolite slurry to form a transition metal zeolite mixture;
(d) adjusting a pH of the transition metal zeolite mixture to obtain a transition metal zeolite product;
(e) heating the transition metal zeolite product to form a transition metal zeolite catalyst precursor;
(f) isolating and washing the transition metal zeolite catalyst precursor;
(g) heat-treating the transition metal zeolite catalyst precursor obtained from step (f) to dry the isolated transition metal zeolite catalyst precursor;
(h) dispersing the dried transition metal zeolite catalyst precursor of step (g) in a solvent to form a noble metal zeolite slurry;
(i) dissolving a noble metal precursor in water to form a noble metal solution, wherein the noble metal precursor comprises one or more salts comprising a noble metal selected from the group consisting of silver, gold, rhodium, iridium, and combinations thereof;
(j) contacting the transition metal zeolite slurry with the noble metal solution to form a transition and noble metal zeolite mixture;

(k) adjusting a pH of the transition and noble metal zeolite mixture to obtain a transition and noble metal zeolite product;
(l) heating the transition and noble metal zeolite product to form transition and noble metal zeolite catalyst particles;
(m) isolating and washing the transition and noble metal zeolite catalyst particles; and
(n) heat-treating the catalyst particles obtained from step (m) to form the solid catalyst component.

15. The method of claim 14, wherein the transition metal precursor comprises one or more salts comprising a transition metal selected from the group consisting of titanium, vanadium, chromium, manganese, iron, cobalt, nickel, copper, zinc, molybdenum, tungsten, and combinations thereof.

* * * * *